United States Patent
Bergström et al.

(10) Patent No.: US 9,749,092 B2
(45) Date of Patent: Aug. 29, 2017

(54) HARQ FEEDBACK REPORTING BASED ON MIRRORED INFORMATION

(71) Applicant: Telefonaktiebolaget L M Ericsson (publ), Stockholm (SE)

(72) Inventors: Andreas Bergström, Vikingstad (SE); Håkan Andersson, Linköping (SE); Johan Furuskog, Stockholm (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 14/443,683

(22) PCT Filed: Apr. 10, 2015

(86) PCT No.: PCT/SE2015/050426
§ 371 (c)(1),
(2) Date: May 19, 2015

(87) PCT Pub. No.: WO2016/060598
PCT Pub. Date: Apr. 21, 2016

(65) Prior Publication Data
US 2016/0261383 A1 Sep. 8, 2016

Related U.S. Application Data

(60) Provisional application No. 62/063,140, filed on Oct. 13, 2014.

(51) Int. Cl.
*H04L 1/18* (2006.01)
*H04L 1/16* (2006.01)
*H04W 72/04* (2009.01)

(52) U.S. Cl.
CPC .......... *H04L 1/1819* (2013.01); *H04L 1/1671* (2013.01); *H04W 72/042* (2013.01)

(58) Field of Classification Search
None
See application file for complete search history.

(56) References Cited

U.S. PATENT DOCUMENTS

2008/0212612 A1 9/2008 Singh et al.
2011/0029831 A1 2/2011 Lee et al.

FOREIGN PATENT DOCUMENTS

EP 1798926 A1 6/2007
WO 2006015252 A1 2/2006
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.
(Continued)

*Primary Examiner* — Brian D Nguyen
*Assistant Examiner* — Hashim Bhatti
(74) *Attorney, Agent, or Firm* — Murphy, Bilak & Homiller, PLLC

(57) ABSTRACT

Techniques according to which HARQ feedback transmitted from a wireless device to a base station includes not only the ACK/NACK status for the corresponding hybrid automatic-repeat-request, HARQ, process, but also certain information that was provided by the network in the last received downlink assignment. An example method, as implemented in a wireless device operating in a wireless communication network, comprises receiving (610) from the wireless communication network, in a first transmission-time interval, a resource-assignment message indicating resources allocated for a data transmission to the wireless device. The example method further comprises transmitting (620) to the wireless communication network, in a second transmission-time interval, feedback information that includes an indication of whether the data transmission was correctly received by the wireless device and further includes one or more mirrored information fields copied from the resource-assignment message.

32 Claims, 6 Drawing Sheets

(56) References Cited

FOREIGN PATENT DOCUMENTS

| WO | 2008041098 A2 | 4/2008 |
|----|---------------|--------|
| WO | 2008096259 A2 | 8/2008 |
| WO | 2011116365 A2 | 9/2011 |
| WO | 2013155473 A1 | 10/2013 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.0.0, Sep. 2012, 1-79.

3GPP, "3rd Generation Partnership Project; Technical Specification Group Radio Access Network; Evolved Universal Terrestrial Radio Access (E-UTRA); Physical Channels and Modulation (Release 11)," 3GPP TS 36.211 V11.0.0, Sep. 2012, 1-106.

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.0.0, Sep. 2012, 1-143.

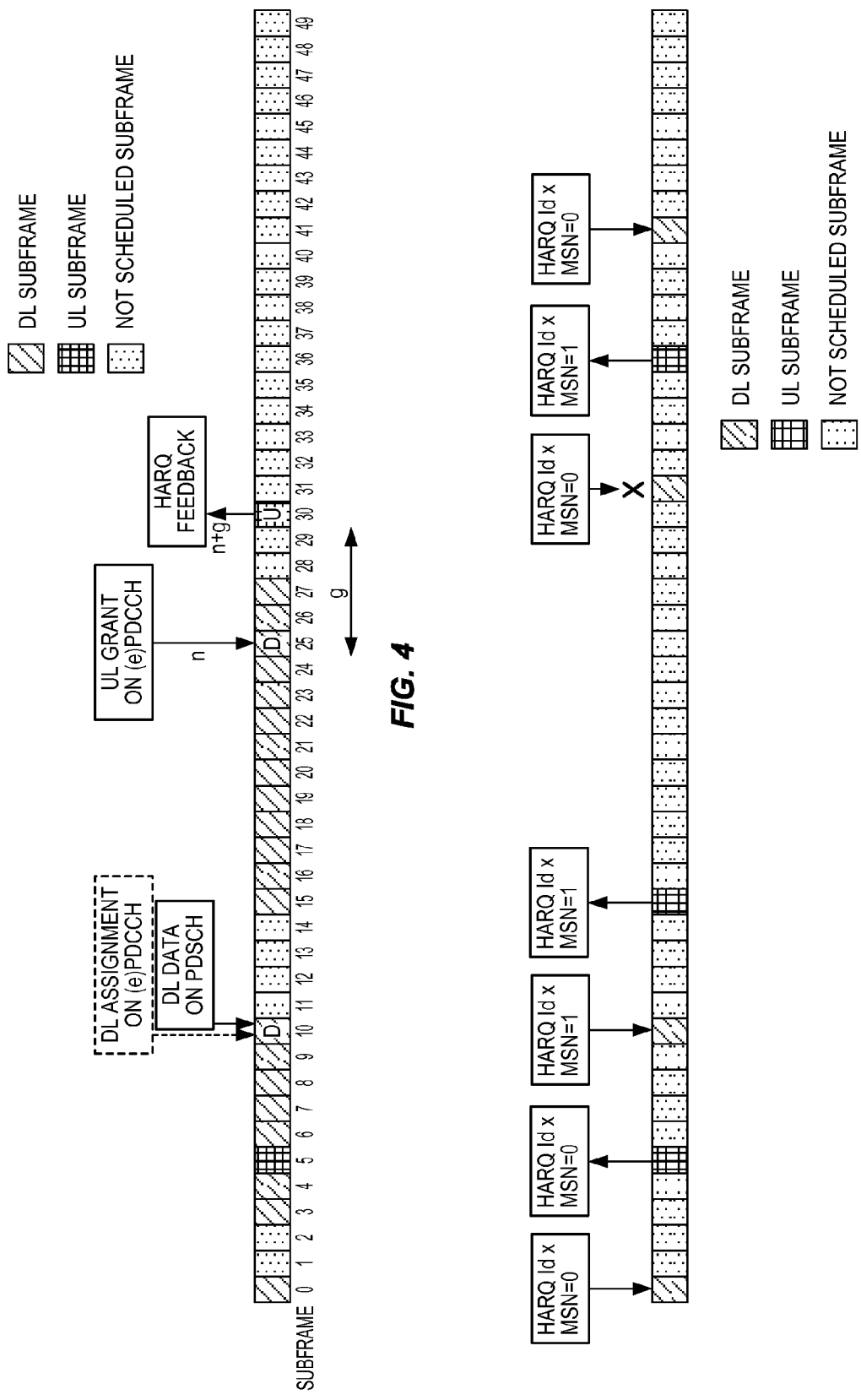

HARQ FEEDBACK REPORTING BASED ON MIRRORED INFORMATION

TECHNICAL FIELD

The technology disclosed herein relates generally to wireless communication networks, and more particularly relates to techniques involving hybrid automatic repeat-request (HARQ) feedback in such networks.

BACKGROUND

Automatic repeat-request (ARQ) is an error-control technique used in many wireless networks. With ARQ, a receiver of data transmissions sends acknowledgements (ACKs) or negative acknowledgments (NACKs) to inform the transmitter of whether each message has been correctly received. Incorrectly received messages, as well as messages that aren't acknowledged at all, can then be re-transmitted.

Hybrid ARQ (HARQ) combines ARQ with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback."

The fourth-generation system widely known as LTE (for Long-Term Evolution) and more formally known as the Evolved UMTS Terrestrial Radio-Access Network (E-UTRAN) has been developed and deployed by members of the $3^{rd}$-Generation Partnership Project (3GPP). For downlink transmissions in LTE today, HARQ feedback is sent from the UE (user equipment—3GPP terminology for a mobile terminal) to the network on either the Physical Uplink Control Channel (PUCCH) or the Physical Uplink Shared Channel (PUSCH), depending on whether or not the UE has been scheduled for uplink PUSCH transmission.

For each downlink transmission to the UE, the UE will transmit an ACK or NACK, depending on whether or not the transmission was correctly received. The network can, apart from detecting ACK or NACK, also draw the conclusion that the UE did not properly receive the corresponding downlink assignment, and thus did not even attempt to demodulate and decode the transmitted data message, if the network detects no feedback from the UE when anticipated. Note, however, that a missed ACK/NACK detection on the network side could also be due to the network's failure to receive it properly, even though it was transmitted by the UE.

A NACK received by the network will trigger a retransmission, whereas the reception of an ACK allows the corresponding HARQ transmit (Tx) process to be flushed and re-used. That a HARQ Tx process has been flushed and is being re-used is indicated to the UE from the network side by toggling the NDI (New Data Indicator) flag in the next downlink assignment for the corresponding HARQ process, along with the new data. This, in turn, will cause the UE to flush the HARQ receive (Rx) process and associate the newly received data with the current HARQ Rx process.

As described above, the failure of the network to receive an ACK/NACK from a UE when expected is an indication of a probable failure by the UE to correctly decode the downlink assignment message, which in LTE is sent on the Physical Downlink Control Channel (PDCCH) or enhanced PDCCH (ePDCCH). Detecting this condition at the network may thus be used for the purpose of PDCCH/ePDCCH link adaptation—i.e. for adapting the robustness of the physical control channel that carries the downlink grant.

While LTE is based on a fixed (or semi-static) division between uplink and downlink, other systems, as well as future versions of LTE, may be based on a dynamically scheduled division between uplink and downlink. In such systems, there may not be a one-to-one correspondence between downlink transmissions and HARQ feedback messages. In such cases, it may be impossible in some situations for the network to determine exactly which downlink assignments the UE has received, which in turn may result in sub-optimal scheduling of retransmissions. Furthermore, in current LTE systems there is an uncertainty as to whether a missed ACK/NACK in the uplink is because the UE has failed to receive the downlink grant or because the network has failed to receive the ACK/NACK despite it being transmitted by the UE after a successful downlink grant reception. If a failed ACK/NACK detection in the uplink is regarded as a missed downlink grant detection, so that link adaptation is subsequently applied in downlink, a problem with reception of the uplink ACK/NACK transmission will remain unsolved, since the uplink feedback performance will not be improved by downlink link adaptation.

SUMMARY

According to several embodiments of the presently disclosed techniques, the problems discussed above are addressed by including, in the HARQ feedback transmitted from the UE to the network, not only the ACK/NACK status for the corresponding HARQ RX process, but also certain information that was provided by the network in the last received downlink assignment. In other words, some of the information received by the UE in a downlink assignment is "mirrored back" to the network in the subsequent HARQ feedback.

In some embodiments, the mirrored information, i.e., the information included in the HARQ feedback along with the ACK/NACK status for the HARQ Rx process, is the New Data Indicator (NDI) and/or the Redundancy Version (RV) that was received in the most recently received downlink assignment. In some of these and in some other embodiments, the mirrored information may include a Message Sequence Number (MSN), which is a new field included in the Downlink Control Information (DCI) message sent by the network to the UE for downlink scheduling assignments. In some embodiments, this field may be a 1-bit field that is similar to the NDI, but may be set by the network as it sees fit. Thus, it can be toggled for every transmission or retransmission, rather than only for new transmissions, as is the case for the NDI.

As discussed in more detail below, the mirrored feedback facilitates a better understanding in the network of the HARQ Rx state in the UE. This allows the network to avoid some unnecessary retransmissions, and also enables the network to use a better redundancy version (RV).

An example method, in a wireless device operating in a wireless communication network, includes receiving from the wireless communication network, in a first transmission-time interval, a resource-assignment message indicating resources allocated for a data transmission to the wireless device. The example method further comprises transmitting to the wireless communication network, in a second transmission-time interval, feedback information that includes an indication of whether the data transmission was correctly received by the wireless device and further includes one or more mirrored information fields copied from the resource-assignment message.

A corresponding example method, as might be implemented in a network node of a wireless communication network, includes transmitting to a wireless device, in a first transmission-time interval, a first resource-assignment message indicating resources allocated for a first data transmission to the wireless device. This example method further comprises receiving from the wireless device, in a second transmission-time interval, feedback information that includes an indication of whether the first data transmission was correctly received by the wireless device and further includes one or more mirrored information fields copied from the first resource-assignment message.

In the detailed description that follows, the example methods summarized are described in detail, as are corresponding devices configured to carry out one or more of the methods disclosed herein. Following the detailed description is a listing of example embodiments of the techniques and apparatus disclosed herein. It should be appreciated however, that this listing of example embodiments is intended to be illustrative, and not exhaustive.

BRIEF DESCRIPTION OF THE FIGURES

FIG. 4 illustrates an example downlink HARQ transmission, followed by a request for and transmission of HARQ feedback.

FIG. 5 illustrates an example use of a one-bit Message Sequence Number as mirrored HARQ information.

DETAILED DESCRIPTION

Figure 1:
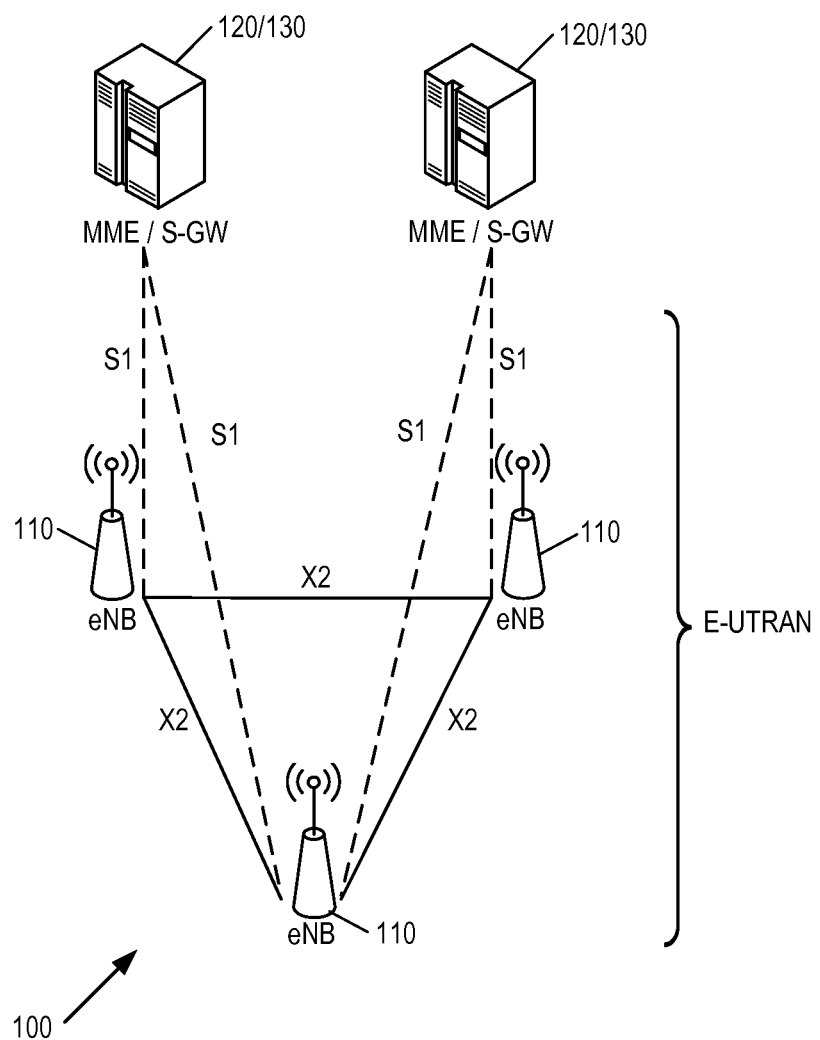
FIG. 1 illustrates components of an example wireless network.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, some embodiments of the present inventive concepts are described herein in the context of operating in or in association with a Radio-Access Network (RAN) that communicates over radio communication channels with mobile terminals (also referred to as wireless terminals or UEs).

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without an intervening RNC, for example, with the functionality of an RNC implemented at base stations and/or in the core network.

As used herein, the terms "mobile terminal," "wireless terminal," "user equipment," or "UE" may be used to refer to any device that receives data from and transmits data to a communication network, any of which may be, for example, a mobile telephone ("cellular" telephone), laptop/portable computer, pocket computer, hand-held computer, desktop computer, a machine-to-machine (M2M) or machine-type-communications (MTC) type device, a sensor with a wireless communication interface, etc. Note that although terminology from specifications for the Long-Term Evolution (LTE), also referred to as the Evolved Universal Terrestrial Radio-Access Network, or E-UTRAN, and/or the Universal Mobile Telecommunications System (UMTS) is used in this disclosure to exemplify embodiments of the inventive concepts, this should not be seen as limiting the scope of the presently disclosed techniques to only these systems. Devices designed for use in other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as "base station" (also referred to as a NodeB, eNodeB, or Evolved Node B) and "wireless terminal" or "mobile terminal" (also referred to as User Equipment node or UE) should be considering non-limiting, and unless the context clearly indicates otherwise, does not imply a particular hierarchical relation between the two. In general, a base station (e.g., a "NodeB" or "eNodeB") and a wireless terminal (e.g., a "UE") may be considered as examples of respective different communications devices that communicate with each other over a wireless radio channel. Thus, for example, while certain techniques described herein may be described as specifically applicable to the downlink or uplink, it should be understood that the same or similar techniques may be applicable to the uplink as well, in the same network or in other networks. Similarly, those skilled in the art will also appreciate that some of these techniques described with respect to a particular direction herein may in some cases apply to either direction in a peer-to-peer or ad hoc network scenario.

The Evolved UMTS Terrestrial Radio-Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected, using the S1 interface, to the EPC (Evolved Packet Core). More specifically, the eNBs are connected to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is illustrated in FIG. 1.

The illustrated network 100 includes eNBs 110, which host functionalities such as Radio Resource Management (RRM), radio bearer control, admission control, header compression of user-plane data towards a serving gateway, and/or routing of user-plane data towards the serving gateway. The MMEs 120 are the control nodes that process the signaling between UEs and the CN (core network). Significant functions of the MMEs 120 are related to connection management and bearer management, which are handled via Non-Access Stratum (NAS) protocols. The S-GWs 130 are the anchor points for UE mobility, and also include other functionalities such as temporary downlink data buffering while the UE is being paged, packet routing and forwarding to the right eNB, and/or gathering of information for charging and lawful interception. The PDN Gateway (P-GW, not shown in FIG. 1) is the node responsible for UE IP address allocation, as well as Quality-of-Service (QoS) enforcement (as further discussed below). The reader is referred to version 12.3.0 of 3GPP TS 36.300, available at www.3gpp.org/dynareport/36300.htm, and the references therein for further details of functionalities of the different nodes.

Figure 2:
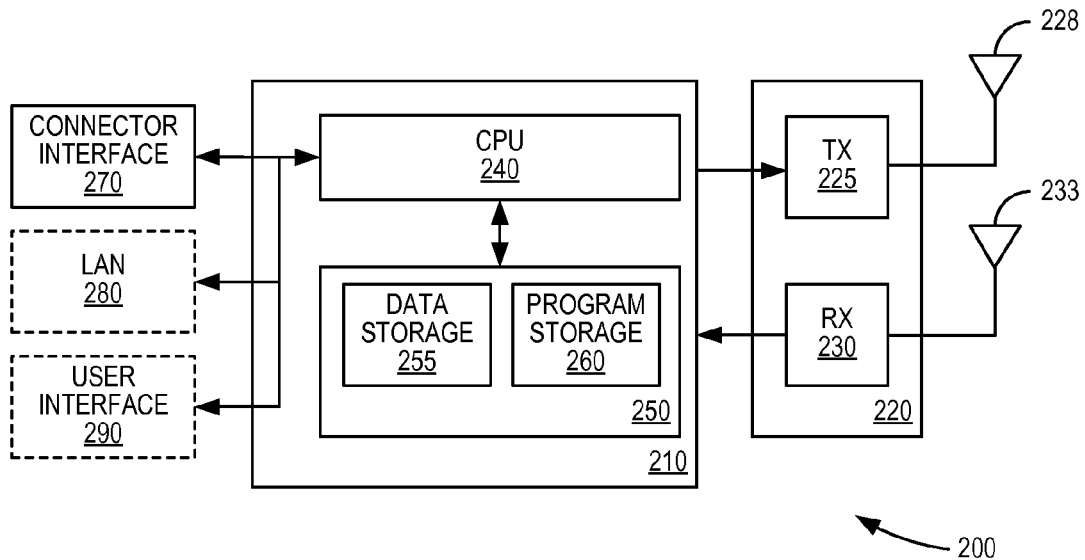
FIG. 2 is a block diagram illustrating components of a wireless device, according to some embodiments of the disclosed techniques and apparatus.

Several of the techniques and methods described herein are implemented using radio circuitry, electronic data processing circuitry, and other electronic hardware provided in a mobile terminal or other wireless device. FIG. 2 illustrates features of an example mobile terminal 200 according to several embodiments of the present invention. Mobile terminal 200, which may be a UE configured for operation with an LTE wireless communication network (E-UTRAN), for example, as well as for operation in a device-to-device mode, in some embodiments, comprises a radio transceiver circuit 220 configured to communicate with one or more base stations as well as a processing circuit 210 configured to process the signals transmitted and received by the transceiver unit 220. Transceiver circuit 220 includes a transmitter 225 coupled to one or more transmit antennas 228 and receiver 230 coupled to one or more receiver antennas 233. The same antenna(s) 228 and 233 may be used for both transmission and reception.

Receiver 230 and transmitter 225 use known radio-processing and signal-processing components and techniques, typically according to a particular telecommunications standard such as the 3GPP standards for LTE. Note also that transceiver circuit 220 may comprise separate radio and/or baseband circuitry for each of two or more different types of radio-access network, in some embodiments. The same applies to the antennas—while in some cases one or more antennas may be used for accessing multiple types of networks, in other cases one or more antennas may be specifically adapted to a particular radio-access network or networks. Because the various details and engineering tradeoffs associated with the design and implementation of such circuitry are well known and are unnecessary to a full understanding of the invention, additional details are not shown here.

Processing circuit 210 comprises one or more processors 240 coupled to one or more memory devices 250 that make up a data-storage memory 255 and a program-storage memory 260. Processor 240, identified as CPU 240 in FIG. 2, may be a microprocessor, microcontroller, or digital signal processor, in some embodiments. More generally, processing circuit 210 may comprise a processor/firmware combination, or specialized digital hardware, or a combination thereof. Memory 250 may comprise one or several types of memory such as read-only memory (ROM), random-access memory, cache memory, flash-memory devices, optical-storage devices, etc. Because terminal 200 may support multiple radio-access networks, including, for example, a wide-area RAN such as LTE as well as a wireless local-area network (WLAN), processing circuit 210 may include separate processing resources dedicated to one or several radio-access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 210 include modulation and coding of transmitted signals and the demodulation and decoding of received signals. In several embodiments of the present invention, processing circuit 210 is adapted, using suitable program code stored in program-storage memory 260, for example, to carry out one of the techniques specifically described herein, including, for example, one or more of the techniques illustrated in FIGS. 4, 5, and 6, and variants thereof. Of course, it will be appreciated that not all of the steps of these techniques are necessarily performed in a single microprocessor or even in a single module.

Mobile terminal 200 may further include one or more additional interface circuits, depending on the specific application for the unit. Typically, mobile terminal 200 includes connector interface circuitry 270. In some embodiments, connector interface circuitry 270 may consist of no more than electrical terminals and associated hardware to support charging of an on-board battery (not shown) or to provide direct-current (DC) power to the illustrated circuits. More often, connector interface circuitry 270 further includes a wired communication and/or control interface, which may operate according to proprietary signaling and message formats in some embodiments, or according to a standardized interface definition, in others. For example, connector interface 270 may comprise electrical terminals and associated hardware for support of the well-known Universal Serial Bus (USB) interface. It will be appreciated that while connector interface circuitry 270 includes at least the necessary receiver and driver circuits to support such an interface and may further comprise specialized hardware/firmware, part of the interface functionality may be provided by CPU 240, configured with appropriate firmware and/or software in memory 250, in some embodiments.

Mobile terminal 200 may further comprise local-area network (LAN) interface circuitry 280, in some embodiments. In some embodiments, for example, LAN interface circuitry 280 may provide support for wireless LAN (WLAN) functionality, such as according to the well-known Wi-Fi standards. In some such embodiments, LAN interface circuitry 280 may include an appropriate antenna or antennas. In other embodiments, LAN interface circuitry 280 may make use of one or more common antenna structures that provide reception and/or transmission of WLAN signals as well as wide-area RAN signals. In some embodiments, LAN interface circuitry 280 may be relatively self-contained, in that it includes all of the necessary hardware, firmware, and/or software to carry out the LAN functionality, including the associated protocol stacks. In other embodiments, at least parts of the LAN functionality may be carried out by processing circuit 210.

Still further, mobile terminal 200 may include user-interface circuitry 290, which may include, for example, circuitry and/or associated hardware for one or more switches, pushbuttons, keypads, touch screens, and the like, for user input, as well as one or more speakers and/or displays for output. Of course, some mobile terminals, such as those developed for machine-to-machine applications or for insertion into another device (e.g., a laptop computer) may have only a subset of these input/output devices, or none at all.

Figure 3:
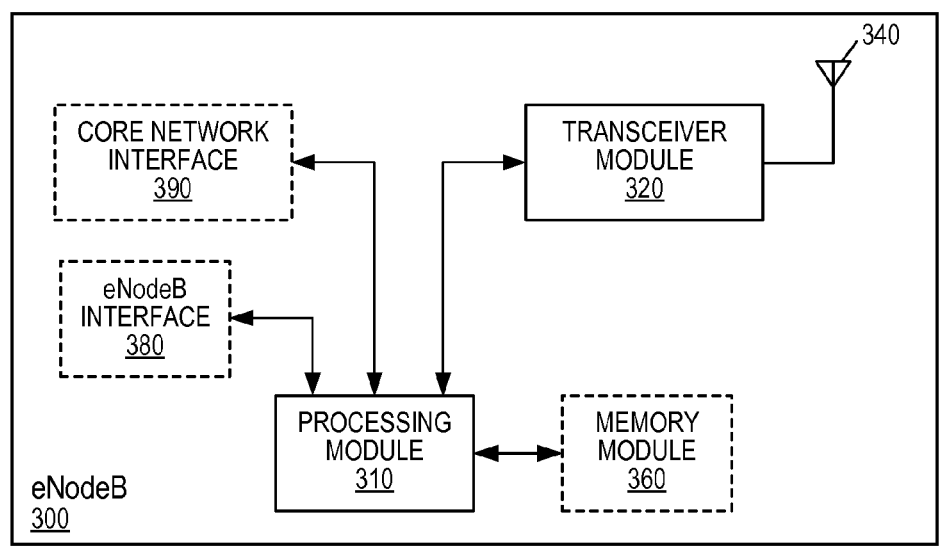
FIG. 3 is a block diagram illustrating components of an example base station, according to some embodiments of the disclosed techniques and apparatus.

FIG. 3 shows an example network node, in this case a base station 300 (for example a NodeB or an eNodeB) that can be used in some of the example embodiments described herein. It will be appreciated that although a macro eNB will not, in practice, be identical in size and structure to a micro eNB, for the purposes of illustration, the base stations 300 in both cases are assumed to include similar components. Thus, whether or not base station 300 corresponds to a macro base station or a micro base station, it comprises a processing module 310 that controls the operation of the base station 300. The processing module 310, which may include one or more microprocessors, microcontrollers, digital signal processors, specialized digital logic, etc., is connected to a transceiver module 320 with associated antenna(s) 340 that are used to transmit signals to, and receive signals from, UEs 200 when operating in a network like that illustrated in FIG. 1. The base station 300 also comprises a memory circuit 360 that is connected to the processing module 310 and that stores program and other information and data required for the operation of the base station 300. Together, the processing module 310 and memory circuit 360 may be referred to as a "processing circuit," and are adapted, in various embodiments, to carry out one or more of the network-based techniques described below.

Base station 300 also comprises an eNodeB interface circuit 380, which includes components and/or circuitry for allowing the base station 300 to exchange information with other base stations 10 (for example, via an X2 interface), and further comprises a core network interface circuit 390, which includes components and/or circuitry for allowing the base station 300 to exchange information with nodes in the core network (for example, via the S1 interface), such as with an MME 120 or S-GW 130, as illustrated in FIG. 1. It will be appreciated that base stations for use in other types of network (e.g., UTRAN or WCDMA RAN) will include similar components to those shown in FIG. 3 and appropriate interface circuitry 380, 390 for enabling communications with the other network nodes in those types of networks (e.g., other base stations, mobility management nodes and/or nodes in the core network).

As discussed above, current LTE systems use HARQ for downlink transmissions, with HARQ feedback being sent by the UE in the uplink. Downlink scheduling is done on a 1-millisecond subframe basis. The scheduling messages are sent each subframe, and the granted resource occupies all of the orthogonal frequency-division multiplexing (OFDM) symbols allocated to the PDSCH in the resource block pairs allocated to the UE in the downlink resource grant. The processing time allowed to the terminal for completing all processing related to a transmission in a given subframe is 3 milliseconds, less the timing advance. The specifications for LTE thus specify that the ACK/NACK in response to a PDSCH transmission in subframe n should be transmitted in the UL in subframe n+4, no matter the size of the transport block or when the assignment ends.

An alternative approach is to provide for explicit scheduling of HARQ feedback. With this approach, the network can decide freely when it wants to schedule the HARQ feedback. Of course, it cannot wait for very long periods, since with every downlink subframe transmitted there is more HARQ feedback collecting that will eventually need to be transmitted.

An example of a HARQ feedback process for one HARQ process—inclusive of the successful reception of the downlink Assignment, downlink data, uplink grant, and the transmission of the HARQ feedback—is shown in FIG. 4. As seen in the figure, a downlink assignment (DL Assignment) for a given UE is transmitted on the downlink in subframe 10, using the PDCCH or ePDCCH. In the same subframe, downlink data for the UE is transmitted on the Physical Downlink Shared Channel (PDSCH). Later, in subframe n, an uplink grant (UL grant) for the same UE is transmitted on the downlink, again using the PDCCH or ePDCCH. In some embodiments, this UL grant includes an explicit HARQ feedback request. (Note that when explicit feedback requests are used, the network may choose to schedule UL grants for data without asking for HARQ feedback each time.) A certain number (g) of subframes later, the UE transmits HARQ feedback corresponding to the DL data transmitted earlier. In the example shown in FIG. 4, the delay from reception of the UL grant until transmission of the HARQ feedback is denoted by g; this parameter is system dependent. It should be appreciated that FIG. 4 illustrates only a single HARQ process. In LTE and in other systems, several processes may be active simultaneously, so that the system need not wait until a HARQ process is concluded before scheduling and sending additional data to the UE.

As noted above, while LTE is based on a fixed (or semi-static) division between uplink and downlink, other systems, as well as future versions of LTE, may be based on a dynamically scheduled division between uplink and downlink. In such systems, there may not be a one-to-one correspondence between downlink transmissions and HARQ feedback messages. In such cases, it may be impossible in some situations for the network to determine exactly which downlink assignments the UE has received, which in turn may result in sub-optimal scheduling of retransmissions. Furthermore, in current LTE systems there is an uncertainty as to whether a missed ACK/NACK in the uplink is because the UE has failed to receive the downlink grant or because the network has failed to receive the ACK/NACK despite it being transmitted by the UE after a successful downlink grant reception.

Several embodiments of the presently disclosed techniques address the problems discussed above by including, in the HARQ feedback transmitted from the UE to the network, not only the ACK/NACK status for the corresponding HARQ RX process, but also certain information that was provided by the network in the last received downlink assignment. In other words, some of the information received by the UE in a downlink assignment is "mirrored back" to the network in the subsequent HARQ feedback. Examples of what this 'mirrored information' is, and how it may be used, are described in detail below.

In some embodiments of the presently disclosed techniques, the 'mirrored information' in the transmitted HARQ Feedback is the New Data Indicator (NDI) indicated in the last received DL Assignment for the HARQ Rx process at issue. In other embodiments, the 'mirrored information' in the transmitted HARQ Feedback is a new Message Sequence Number (MSN) (as described below) included in the last received DL Assignment for the considered HARQ Rx process. In yet other embodiments, the 'mirrored information' contains both the NDI and the MSN.

Message Sequence Number—In some embodiments, the 'DL Assignment' message is amended to include an MSN (Message Sequence Number), which is a one-bit or multi-bit field that may be filled with whatever information the network sees fit. The UE does not take any action based on this information, but simply echoes/mirrors it back to the NW as part of the HARQ feedback for the corresponding HARQ process.

In some embodiments, the MSN is incremented by the network upon each transmission or retransmission made for the current DL Data on the given HARQ Tx process. If the MSN is only one bit, each increment becomes a toggling between 0 and 1, and hence the behavior becomes quite similar to the NDI as described earlier. The difference, however, is that the MSN can also be toggled upon retransmissions and not only on the initial transmission as for the NDI.

In other embodiments, the MSN is incremented by the network when it receives the same MSN in the HARQ feedback report as was indicated in the last transmitted DL Assignment for the given HARQ Tx process.

This procedure is illustrated in FIG. 5, for the case of the MSN being a one-bit field. Here, the network first (starting at the left-hand side of the figure) indicates MSN=0 for HARQ Id x in a successfully received DL Assignment sent in the first illustrated subframe. Subsequently, the UE echoes back MSN=0 for this HARQ Id x in the next HARQ feedback, transmitted a few subframes later. The NW then toggles the MSN and transmits MSN=1 in the next DL Assignment.

Later (moving to the right in the figure), the network again indicates MSN=0 for HARQ Id x for the DL Assignment. In this instance, however the DL Assignment is not successfully received by the UE, as indicated by the "X" above the illustrated subframe. Hence, the UE will fail to update the HARQ Rx process with the new MSN and instead continues to indicate the old MSN=1 in the next HARQ feedback transmitted. Consequently, the network will detect this mismatch between the MSN last transmitted by the UE and the one transmitted in the earlier DL Assignment, and will once more indicate MSN=0 for the retransmission.

Using these techniques, whenever the network receives 'mirrored information' (e.g., an MSN or NDI) in the HARQ feedback that differs from what was included in the preceding DL Assignment for the considered HARQ process, it can draw the conclusion that the DL Assignment was not successfully received by the UE. In some embodiments, the network uses the detection of this condition to retransmit using the same redundancy version (RV) as in the last transmission, since the UE obviously would not have been able to store any soft bits from the last DL transmission.

In some of these and in some other embodiments, the network will use the detection of this condition (i.e., the receipt of mirrored information that differs from what was included in the preceding DL assignment for the HARQ process) to adjust the (e)PDCCH link adaptation, output power, etc., to ensure better reliability for upcoming (e)PD-CCH transmissions for this UE.

In either or both cases, the quality of the DL HARQ feedback is improved by mirroring information contained in the DL grant, thus enabling better use of redundancy versions in DL retransmissions.

Figure 6:
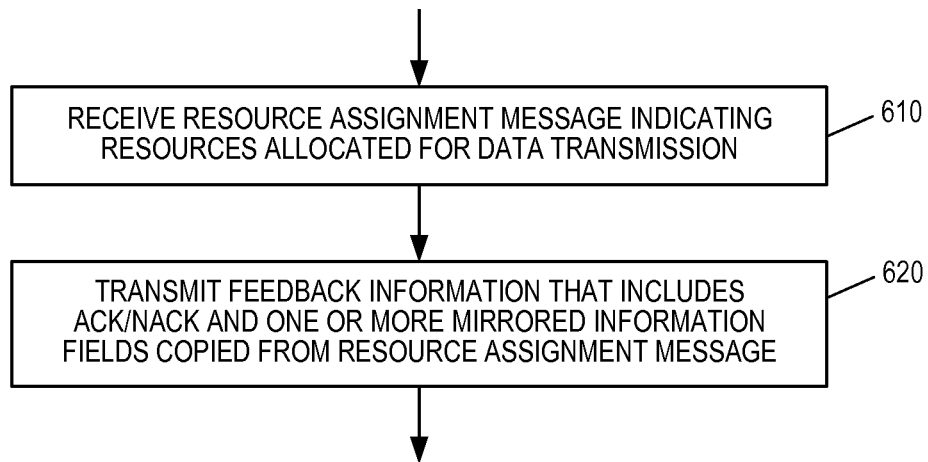
FIG. 6 is a process flow diagram illustrating an example method.

Given the above detailed examples of techniques for HARQ feedback reporting and processing, it should be appreciated that these techniques may be applied more generally. FIG. 6 illustrates an example method that may be carried out in a wireless device operating in a wireless communication network, such as a UE operating in an enhanced LTE wireless network.

As shown at block 610, the illustrated method includes receiving from the wireless communication network, in a first transmission-time interval, a resource-assignment message indicating resources allocated for a data transmission to the wireless device. As shown at block 620, the method further includes transmitting to the wireless communication network, in a second transmission-time interval, feedback information that includes an indication of whether the data transmission was correctly received by the wireless device and further includes one or more mirrored information fields copied from the resource-assignment message.

The mirrored field or fields may comprise any of a wide variety of fields that are included in the resource-assignment message. In some embodiments, the one or more mirrored information fields comprise a new data indicator (NDI) field copied from the resource-assignment message, wherein the NDI in the resource-assignment message indicates whether the data transmission includes new data or is a retransmission of previously transmitted data. In some of these or in some other embodiments, the one or more mirrored information fields comprise a redundancy version (RV) field copied from the resource-assignment message, where the RV field in the resource-assignment message indicates one of a plurality of possible redundancy versions for the encoding of data in the data transmission.

In some embodiments, the one or more mirrored information fields comprise a message sequence number (MSN) field from the resource-assignment message; the mirrored MSN field may accompany other mirrored fields in some embodiments. In some embodiments, the MSN field is a one-bit field having a value that is toggled by a node in the wireless communication network for each transmission and retransmission for a given hybrid automatic repeat-request (HARQ) process. In others, the MSN field is a multi-bit field having a value that is incremented by a node in the wireless communication network for each transmission and retransmission for a given hybrid automatic repeat-request (HARQ) process.

Figure 7:
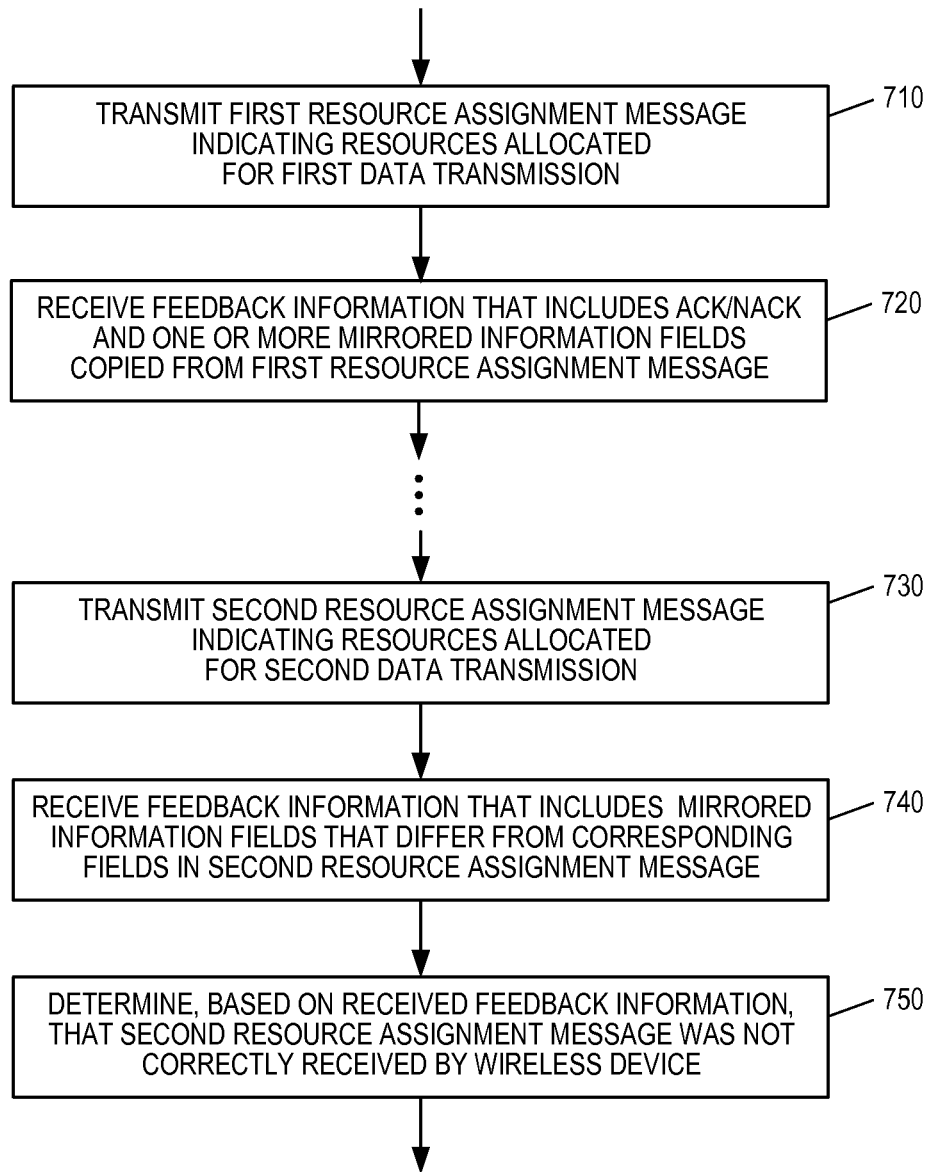
FIG. 7 is a process flow diagram illustrating another example method.

FIG. 7 illustrates an example method that may be carried out in a network node of a wireless communication network, such as a base station (eNodeB) operating in an enhanced LTE wireless network.

As shown at block 710, the illustrated method includes transmitting to a wireless device, in a first transmission-time interval, a first resource-assignment message indicating resources allocated for a first data transmission to the wireless device. As shown at block 720, the method further includes receiving from the wireless device, in a second transmission-time interval, feedback information that includes an indication of whether the data transmission was correctly received by the wireless device and that further includes one or more mirrored information fields copied from the resource-assignment message.

Again, the mirrored field or fields may comprise any of a wide variety of fields that are included in the resource-assignment message. In some embodiments, the one or more mirrored information fields comprise a new data indicator (NDI) field copied from the resource-assignment message, where the NDI in the resource-assignment message indicates whether the data transmission includes new data or is a retransmission of previously transmitted data. In some of these or in some other embodiments, the one or more mirrored information fields comprise a redundancy version (RV) field copied from the resource-assignment message, where the RV field in the resource-assignment message indicates one of a plurality of possible redundancy versions for the encoding of data in the data transmission.

In some embodiments, the one or more mirrored information fields comprise a message sequence number (MSN) field from the resource-assignment message; the mirrored MSN field may accompany other mirrored fields in some embodiments. In some embodiments, the MSN field is a one-bit field having a value that is toggled by a node in the wireless communication network for each transmission and retransmission for a given hybrid automatic repeat-request (HARQ) process. In others, the MSN field is a multi-bit field having a value that is incremented by a node in the wireless communication network for each transmission and retransmission for a given hybrid automatic repeat-request (HARQ) process.

FIG. 7 also illustrates operations carried out by the network node in the event that a resource-assignment message is not correctly received by the wireless device. In this scenario, as shown at block 730, the method further comprises transmitting to the wireless device, in a third transmission-time interval, a second resource-assignment message indicating resources allocated for a second data transmission to the wireless device, the second data transmission corresponding to a particular hybrid automatic repeat-request (HARQ) process. As shown at block 740, the method still further comprises receiving from the wireless device, in a fourth transmission-time interval, feedback information corresponding to the particular HARQ process but including one or more mirrored information fields that differ from the corresponding information fields included in the second resource-assignment message. Finally, as shown at block 750, the illustrated method includes determining, based on the feedback information received in the fourth transmission-time interval, that the second resource-assignment message was not correctly received by the wireless device.

Any of several actions might be taken by the network node in response to determining that the second resource-assignment message was not correctly received. In some embodiments, for example, the network node may, in response to this determining, retransmit the second data transmission using the same redundancy version as was used for the preceding transmission. In some of these and in some other embodiments, the network node may, in response to this determining, adjust one or more transmission parameters for one or more succeeding transmissions of resource-assignment messages, such as a transmit power, a transport format, a link adaptation parameter, etc.

Embodiments of the presently disclosed techniques include the several methods described above, including the methods illustrated in the process flow diagrams of FIGS. 6 and 7, as well as variants thereof. Other embodiments include mobile terminal apparatus and corresponding network node configured to carry out one or more of these methods. In some embodiments of the invention, processing circuits, such as the processing circuit 210 in FIG. 2 or the processing module 310 and memory circuit 360 of FIG. 3, are configured to carry out one or more of the techniques described in detail above. Likewise, other embodiments may include mobile terminals and network nodes that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will further be appreciated that various aspects of the above-described embodiments can be understood as being carried out by functional "modules" corresponding to the method steps illustrated in FIGS. 6 and 7. These functional modules may be program instructions executing on an appropriate processor circuit, hard-coded digital circuitry and/or analog circuitry, or appropriate combinations thereof, e.g., in network nodes and wireless devices having hardware configurations like those shown in FIGS. 2 and 3.

Figure 8:
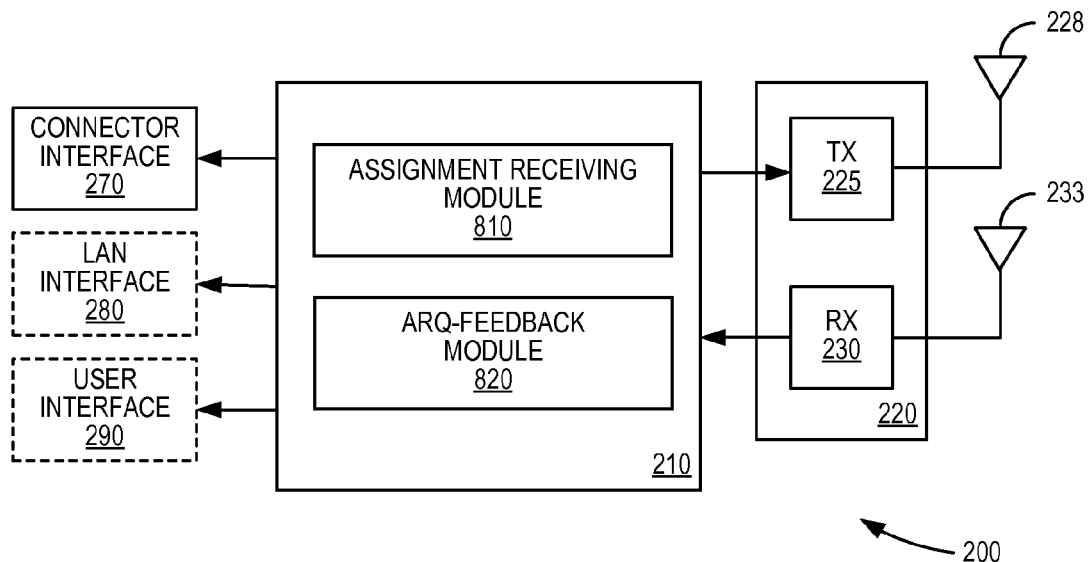
FIG. 8 is a block diagram providing another view of an example wireless device.

For example, FIG. 8 is a block diagram illustrating another view of the example wireless device 200 shown in FIG. 2, but where the processing circuit is illustrated according to this functional view. In FIG. 8, processing circuitry 210 comprises an assignment-receiving module 810, which is adapted to receive from a wireless communication network, in a first transmission-time interval, a resource-assignment message indicating resources allocated for a data transmission to the wireless device. The processing circuitry 210 further comprises a HARQ feedback module 820, which is adapted to transmit to the wireless communication network, in a second transmission-time interval, feedback information that includes an indication of whether the data transmission was correctly received by the wireless device and further includes one or more mirrored information fields copied from the resource-assignment message.

Figure 9:
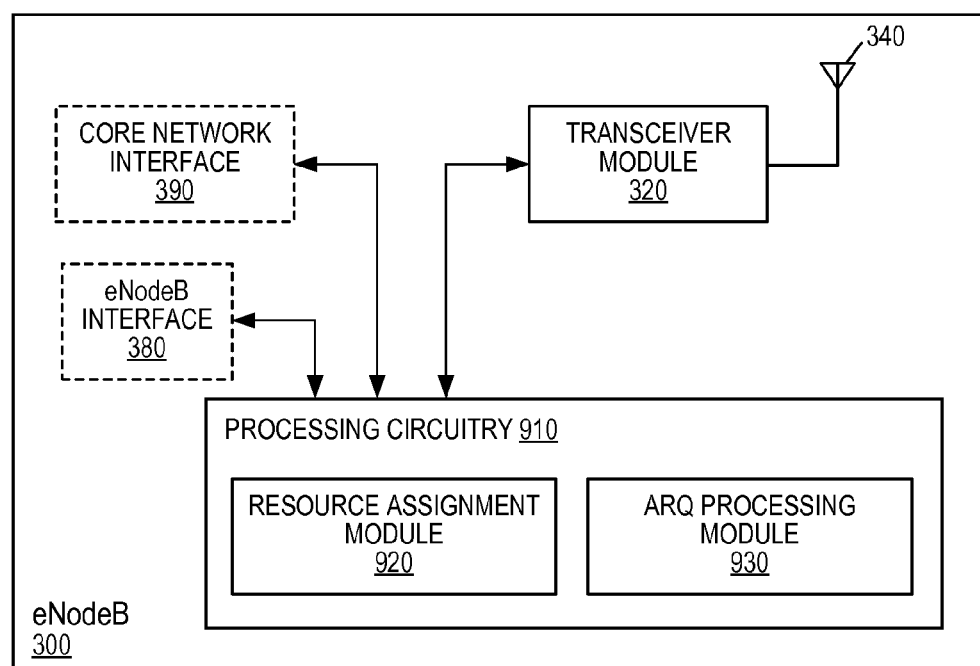
FIG. 9 is a block diagram providing another view of an example base station.

Similarly, FIG. 9 is a block diagram illustrating another view of the example base station 300 depicted in FIG. 3, but where the processing circuit of base station 300 is illustrated according to a functional view. In FIG. 9, a processing circuit 910 comprises a resource-assignment module 920, which is adapted to transmit to a wireless device, in a first transmission-time interval, a first resource-assignment message indicating resources allocated for a first data transmission to the wireless device. Processing circuit 910 further comprises a HARQ-processing module 930 configured to receive from the wireless device, in a second transmission-time interval, feedback information that includes an indication of whether the first data transmission was correctly received by the wireless device and further includes one or more mirrored information fields copied from the first resource-assignment message.

Resource-assignment module 920 is further configured, in some embodiments, to transmit to a wireless device, in a third transmission-time interval, a second resource-assignment message indicating resources allocated for a second data transmission to the wireless device, the second data transmission corresponding to a particular hybrid automatic repeat-request (HARQ) process. The HARQ processing module 930 is further configured, in these embodiments, to receive from the wireless device, in a fourth transmission-time interval, feedback information corresponding to the particular HARQ process but including one or more mirrored information fields that differ from the corresponding information fields included in the second resource-assignment message. The HARQ processing module 930 is still further configured, in these embodiments, to determine, based on the feedback information received in the fourth transmission-time interval, that the second resource-assignment message was not correctly received by the wireless device.

It will be appreciated by the person of skill in the art that various modifications may be made to the above-described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general-purpose computer circuit, special-purpose computer circuit, and/or other programmable data-processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data-processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

Example Embodiments

Embodiments of the presently disclosed techniques and apparatus include, but are not limited to, the following:

(a) A method, in a wireless device operating in a wireless communication network, the method comprising:
  receiving from the wireless communication network, in a first transmission-time interval, a resource-assignment message indicating resources allocated for a data transmission to the wireless device; and
  transmitting to the wireless communication network, in a second transmission-time interval, feedback information that includes an indication of whether the data transmission was correctly received by the wireless device and further includes one or more mirrored information fields copied from the resource-assignment message.

(b) The method of example embodiment (a), wherein the one or more mirrored information fields comprise a new data indicator (NDI) field copied from the resource-assignment message, wherein the NDI in the resource-assignment message indicates whether the data transmission includes new data or is a retransmission of previously transmitted data.

(c) The method of example embodiment (a) or (b), wherein the one or more mirrored information fields comprise a redundancy version (RV) field copied from the resource-assignment message, wherein the RV field in the resource-assignment message indicates one of a plurality of possible redundancy versions for the encoding of data in the data transmission.

(d) The method of any of example embodiments (a)-(c), wherein the one or more mirrored information fields comprise a message sequence number (MSN) field from the resource-assignment message.

(e) The method of example embodiment (d), wherein the MSN field is a one-bit field having a value that is toggled by a node in the wireless communication network for each transmission and retransmission for a given hybrid automatic repeat-request (HARQ) process.

(f) The method of example embodiment (d), wherein the MSN field is a multi-bit field having a value that is incremented by a node in the wireless communication network for each transmission and retransmission for a given hybrid automatic repeat-request (HARQ) process.

(g) A method, in a network node of a wireless communication network, the method comprising:
  transmitting to a wireless device, in a first transmission-time interval, a first resource-assignment message indicating resources allocated for a first data transmission to the wireless device; and
  receiving from the wireless device, in a second transmission-time interval, feedback information that includes an indication of whether the first data transmission was correctly received by the wireless device and further includes one or more mirrored information fields copied from the first resource-assignment message.

(h) The method of example embodiment (g), wherein the one or more mirrored information fields comprise a new data indicator (NDI) field copied from the first resource-assignment message, wherein the NDI in the resource-assignment message indicates whether the first data transmission includes new data or is a retransmission of previously transmitted data.

(i) The method of example embodiment (g) or (h), wherein the one or more mirrored information fields comprise a redundancy version (RV) field copied from the first resource-assignment message, wherein the RV field in the resource-assignment message indicates one of a plurality of possible redundancy versions for the encoding of data in the first data transmission.

(j) The method of any of example embodiments (g)-(i), wherein the one or more mirrored information fields comprise a message sequence number (MSN) field from the first resource-assignment message.

(k) The method of example embodiment (j), wherein the MSN field is a one-bit field having a value that is toggled by a node in the wireless communication network for each transmission and retransmission for a given hybrid automatic repeat-request (HARQ) process.

(l) The method of example embodiment (j), wherein the MSN field is a multi-bit field having a value that is incremented by a node in the wireless communication network for each transmission and retransmission for a given hybrid automatic repeat-request (HARQ) process.

(m) The method of any of example embodiments (g)-(l), further comprising:
  transmitting to a wireless device, in a third transmission-time interval, a second resource-assignment message indicating resources allocated for a second data transmission to the wireless device, the second data transmission corresponding to a particular hybrid automatic repeat-request (HARQ) process;
  receiving from the wireless device, in a fourth transmission-time interval, feedback information corresponding to the particular HARQ process but including one or more mirrored information fields that differ from the corresponding information fields included in the second resource-assignment message; and
  determining, based on the feedback information received in the fourth transmission-time interval, that the second resource-assignment message was not correctly received by the wireless device.

(n) The method of example embodiment (m), further comprising, in response to said determining, retransmitting the second data transmission using the same redundancy version as was used for the preceding transmission.

(o) The method of example embodiment (m) or (n), further comprising, in response to said determining, adjusting one or more transmission parameters for one or more succeeding transmissions of resource-assignment messages.

(p) A wireless device arranged for operation in a wireless communication network, the wireless device comprising:
  means for receiving from the wireless communication network, in a first transmission-time interval, a resource-assignment message indicating resources allocated for a data transmission to the wireless device; and
  means for transmitting to the wireless communication network, in a second transmission-time interval, feedback information that includes an indication of whether the data transmission was correctly received by the wireless device and further includes one or more mirrored information fields copied from the resource-assignment message.

(q) A wireless device adapted to operate in a wireless communication network, the wireless device comprising a radio transceiver configured to communicate with a network node and further comprising a processing circuit adapted to use the radio transceiver to:
  receive from the network node, in a first transmission-time interval, a resource-assignment message indicating resources allocated for a data transmission to the wireless device; and transmit to the wireless communication network, in a second transmission-time interval, feedback information that includes an indication of whether the data transmission was correctly received by the wireless device and further includes one or more mirrored information fields copied from the resource-assignment message.

(r) The wireless device of example embodiment (p) or (q), wherein the wireless device is further adapted to carry out the method of any of example embodiments (b)-(f).

(s) A network node of a wireless communication system, the network node comprising:
  means for transmitting to a wireless device, in a first transmission-time interval, a first resource-assignment message indicating resources allocated for a first data transmission to the wireless device; and
  means for receiving from the wireless device, in a second transmission-time interval, feedback information that includes an indication of whether the first data transmission was correctly received by the wireless device and further includes one or more mirrored information fields copied from the first resource-assignment message.

(t) A network node of a wireless communication system, the network node comprising a radio transceiver configured to communicate with wireless devices and further comprising a processing adapted to use the radio transceiver to:
  transmit to a wireless device, in a first transmission-time interval, a first resource-assignment message indicating resources allocated for a first data transmission to the wireless device; and
  receive from the wireless device, in a second transmission-time interval, feedback information that includes an indication of whether the first data transmission was correctly received by the wireless device and further includes one or more mirrored information fields copied from the first resource-assignment message.

(u) The network node of example embodiment (s) or (t), wherein the network node is further adapted to carry out the method of any of example embodiments (g)-(o).

What is claimed is:

1. A method, in a wireless device operating in a wireless communication network, the method comprising:
  receiving from the wireless communication network, in a first transmission-time interval, a resource-assignment message indicating resources allocated for a data transmission to the wireless device; and
  transmitting to the wireless communication network, in a second transmission-time interval, feedback information that includes an indication of whether the data transmission was correctly received by the wireless device and further includes one or more mirrored information fields copied from the resource-assignment message.

2. The method of claim 1, wherein the one or more mirrored information fields comprise a new data indicator (NDI) field copied from the resource-assignment message, wherein the NDI field in the resource-assignment message indicates whether the data transmission includes new data or is a retransmission of previously transmitted data.

3. The method of claim 1, wherein the one or more mirrored information fields comprise a redundancy version (RV) field copied from the resource-assignment message, wherein the RV field in the resource-assignment message indicates one of a plurality of possible redundancy versions for the encoding of data in the data transmission.

4. The method of claim 1, wherein the one or more mirrored information fields comprise a message sequence number (MSN) field from the resource-assignment message.

5. The method of claim 4, wherein the MSN field is a one-bit field having a value that is toggled by a node in the wireless communication network for each transmission and retransmission for a given hybrid automatic repeat-request (HARQ) process.

6. The method of claim 4, wherein the MSN field is a multi-bit field having a value that is incremented by a node in the wireless communication network for each transmission and retransmission for a given hybrid automatic repeat-request (HARQ) process.

7. A method, in a network node of a wireless communication network, the method comprising:
  transmitting to a wireless device, in a first transmission-time interval, a first resource-assignment message indicating resources allocated for a first data transmission to the wireless device; and
  receiving from the wireless device, in a second transmission-time interval, feedback information that includes an indication of whether the first data transmission was correctly received by the wireless device and further includes one or more mirrored information fields copied from the first resource-assignment message.

8. The method of claim 7, wherein the one or more mirrored information fields comprise a new data indicator (NDI) field copied from the first resource-assignment message, wherein the NDI field in the resource-assignment message indicates whether the first data transmission includes new data or is a retransmission of previously transmitted data.

9. The method of claim 7, wherein the one or more mirrored information fields comprise a redundancy version (RV) field copied from the first resource-assignment message, wherein the RV field in the resource-assignment message indicates one of a plurality of possible redundancy versions for the encoding of data in the first data transmission.

10. The method of claim 7, wherein the one or more mirrored information fields comprise a message sequence number (MSN) field from the first resource-assignment message.

11. The method of claim 10, wherein the MSN field is a one-bit field having a value that is toggled by a node in the wireless communication network for each transmission and retransmission for a given hybrid automatic repeat-request (HARQ) process.

12. The method of claim 10, wherein the MSN field is a multi-bit field having a value that is incremented by a node in the wireless communication network for each transmission and retransmission for a given hybrid automatic repeat-request (HARQ) process.

13. The method of claim 7, further comprising:
  transmitting to a wireless device, in a third transmission-time interval, a second resource-assignment message indicating resources allocated for a second data transmission to the wireless device, the second data transmission corresponding to a particular hybrid automatic repeat-request (HARQ) process;
  receiving from the wireless device, in a fourth transmission-time interval, feedback information corresponding to the particular HARQ process but including one or more mirrored information fields that differ from the corresponding information fields included in the second resource-assignment message; and determining, based on the feedback information received in the fourth transmission-time interval, that the second resource-assignment message was not correctly received by the wireless device.

14. The method of claim 13, further comprising, in response to said determining, retransmitting the second data transmission using the same redundancy version as was used for the preceding transmission.

15. The method of claim 13, further comprising, in response to said determining, adjusting one or more transmission parameters for one or more succeeding transmissions of resource-assignment messages.

16. A wireless device configured for operation in a wireless communication network, the wireless device comprising a radio transceiver configured to communicate with a network node and further comprising a processing circuit configured to use the radio transceiver to:
  receive from the network node, in a first transmission-time interval, a resource-assignment message indicating resources allocated for a data transmission to the wireless device; and
  transmit to the wireless communication network, in a second transmission-time interval, feedback information that includes an indication of whether the data transmission was correctly received by the wireless device and further includes one or more mirrored information fields copied from the resource-assignment message.

17. The wireless device of claim 16, wherein the one or more mirrored information fields comprise a new data indicator (NDI) field copied from the resource-assignment message, wherein the NDI field in the resource-assignment message indicates whether the data transmission includes new data or is a retransmission of previously transmitted data.

18. The wireless device of claim 16, wherein the one or more mirrored information fields comprise a redundancy version (RV) field copied from the resource assignment-message, wherein the RV field in the resource assignment-message indicates one of a plurality of possible redundancy versions for the encoding of data in the data transmission.

19. The wireless device of claim 16, wherein the one or more mirrored information fields comprise a message sequence number (MSN) field from the resource-assignment message.

20. The wireless device of claim 19, wherein the MSN field is a one-bit field having a value that is toggled by a node in the wireless communication network for each transmission and retransmission for a given hybrid automatic repeat-request (HARQ) process.

21. The wireless device of claim 19, wherein the MSN field is a multi-bit field having a value that is incremented by a node in the wireless communication network for each transmission and retransmission for a given hybrid automatic repeat-request (HARQ) process.

22. A network node of a wireless communication system, the network node comprising a radio transceiver configured to communicate with wireless devices and further comprising a processing circuit configured to use the radio transceiver to:
  transmit to a wireless device, in a first transmission-time interval, a first resource-assignment message indicating resources allocated for a first data transmission to the wireless device; and
  receive from the wireless device, in a second transmission-time interval, feedback information that includes an indication of whether the first data transmission was correctly received by the wireless device and further includes one or more mirrored information fields copied from the first resource-assignment message.

23. The network node of claim 22, wherein the one or more mirrored information fields comprise a new data indicator (NDI) field copied from the first resource-assignment message, wherein the NDI field in the resource-assignment message indicates whether the first data transmission includes new data or is a retransmission of previously transmitted data.

24. The network node of claim 22, wherein the one or more mirrored information fields comprise a redundancy version (RV) field copied from the first resource-assignment message, wherein the RV field in the resource-assignment message indicates one of a plurality of possible redundancy versions for the encoding of data in the first data transmission.

25. The network node of claim 22, wherein the one or more mirrored information fields comprise a message sequence number (MSN) field from the first resource-assignment message.

26. The network node of claim 25, wherein the MSN field is a one-bit field having a value that is toggled by a node in the wireless communication network for each transmission and retransmission for a given hybrid automatic repeat-request (HARQ) process.

27. The network node of claim 25, wherein the MSN field is a multi-bit field having a value that is incremented by a node in the wireless communication network for each transmission and retransmission for a given hybrid automatic repeat-request (HARQ) process.

28. The network node of claim 22, wherein the network node is further configured to:
  transmit to a wireless device, in a third transmission-time interval, a second resource-assignment message indicating resources allocated for a second data transmission to the wireless device, the second data transmission corresponding to a particular hybrid automatic repeat-request (HARQ) process;
  receive from the wireless device, in a fourth transmission-time interval, feedback information corresponding to the particular HARQ process but including one or more mirrored information fields that differ from the corresponding information fields included in the second resource-assignment message; and
  determine, based on the feedback information received in the fourth transmission-time interval, that the second resource-assignment message was not correctly received by the wireless device.

29. The network node of claim 28, wherein the network node is further configured to retransmit the second data transmission, in response to said determining, using the same redundancy version as was used for the preceding transmission.

30. The network node of claim 28, wherein the network node is further configured to adjust, in response to said determining, one or more transmission parameters for one or more succeeding transmissions of resource-assignment messages.

31. A non-transitory computer-readable medium comprising, stored thereupon, program instructions that, when executed by a processing circuit in a wireless device operating in a wireless communication network, cause the wireless device to:
  receive from the wireless communication network, in a first transmission-time interval, a resource-assignment message indicating resources allocated for a data transmission to the wireless device; and transmit to the wireless communication network, in a second transmission-time interval, feedback information that includes an indication of whether the data transmission was correctly received by the wireless device and further includes one or more mirrored information fields copied from the resource-assignment message.

32. A non-transitory computer-readable medium comprising, stored thereupon, program instructions that, when executed by a processing circuit in a network node of a wireless communication network, cause the network node to:

transmit to a wireless device, in a first transmission-time interval, a first resource-assignment message indicating resources allocated for a first data transmission to the wireless device; and receive from the wireless device, in a second transmission-time interval, feedback information that includes an indication of whether the first data transmission was correctly received by the wireless device and further includes one or more mirrored information fields copied from the first resource-assignment message.

* * * * *